US00RE35683E

United States Patent [19]

Varlet

[11] E Patent Number: Re. 35,683

[45] Reissued Date of Patent: Dec. 9, 1997

[54] METHOD OF VACUUM PACKAGING SUBSTANCES, IN PARTICULAR COSMETIC OR PHARMACEUTICAL PRODUCTS, INSIDE VARIABLE-CAPACITY CONTAINERS CLOSED BY DISPENSER MEMBERS, THAT PREVENT INGRESS OF AIR, APPARATUS FOR IMPLEMENTING THE METHOD, AND DISPENSERS OBTAINED THEREBY

[75] Inventor: Jean-Pierre Varlet, Le Neubourg, France

[73] Assignee: Valois (Société anonyme), Le Neubourg, France

[21] Appl. No.: 518,280

[22] Filed: Aug. 23, 1995

Related U.S. Patent Documents

Reissue of:

[64] Patent No.: 5,237,797
Issued: Aug. 24, 1993
Appl. No.: 6,998
Filed: Jan. 21, 1993

U.S. Applications:

[63] Continuation of Ser. No. 605,309, Oct. 30, 1990, abandoned.

[30] Foreign Application Priority Data

Oct. 31, 1989 [FR] France ..... 89 14260
Oct. 18, 1990 [FR] France ..... 90 12888

[51] Int. Cl.[6] ..... B65B 3/16; B65B 7/02; B65B 31/02

[52] U.S. Cl. ..... 53/420; 53/434; 53/469; 53/471; 53/473; 53/432

[58] Field of Search ..... 53/86, 133.2, 510.512, 53/432, 434, 420, 471, 473, 470, 480, 485, 486, 488, 408, 457, 459, 469

[56] References Cited

U.S. PATENT DOCUMENTS

| | | | |
|---|---|---|---|
| 2,723,200 | 11/1955 | Pyenson | 53/432 |
| 3,234,707 | 2/1966 | Weston | 53/510 X |
| 3,336,720 | 8/1967 | Honsich | 53/510 X |
| 3,463,342 | 8/1969 | Bender et al. | 53/510 |
| 3,545,170 | 12/1970 | Leonard | 53/109 X |
| 3,996,725 | 12/1976 | Walles | 53/510 X |
| 4,283,901 | 8/1981 | Scheiser et al. | 53/512 X |
| 4,909,014 | 3/1990 | Kobayashi et al. | 53/86 |
| 4,984,712 | 1/1991 | Jouillet | 222/95 |

FOREIGN PATENT DOCUMENTS

| | | |
|---|---|---|
| 32489 | 10/1988 | European Pat. Off. . |
| 2343137 | 2/1980 | France . |
| 2633249 | 11/1990 | France . |

*Primary Examiner*—Linda Johnson
*Attorney, Agent, or Firm*—Sughrue,Mion,Zinn,Macpeak & Seas, PLLC

[57] ABSTRACT

A method for packaging a liquid to semi-solid substance under a vacuum inside a variable-capacity container closed by a dispenser member that prevents ingress of air, includes at least a stage in which the dispenser member is fixed in sealed manner on the container filled with the substance. The fixing takes place while the container is inside an enclosure in which an air vacuum is maintained. Apparatus for implementing the method includes, for example, a ring suitable for bearing downwards in sealed manner on the open top of a socket containing the container, thereby enabling the enclosure to be established. A device is provided therein for sucking out the air, and also for fixing on the dispenser member. It is possible to obtain like this dispensers that are particularly advantageous, particularly when the dispenser member is a precompression pump.

7 Claims, 13 Drawing Sheets

R
110
120
11
15
130
111
131
132
133
145
146
144
143
134
140
10
12
121
13
114
113
128
138
139
112
141
1

1
130
141
142
143
140
14

FIG. 21
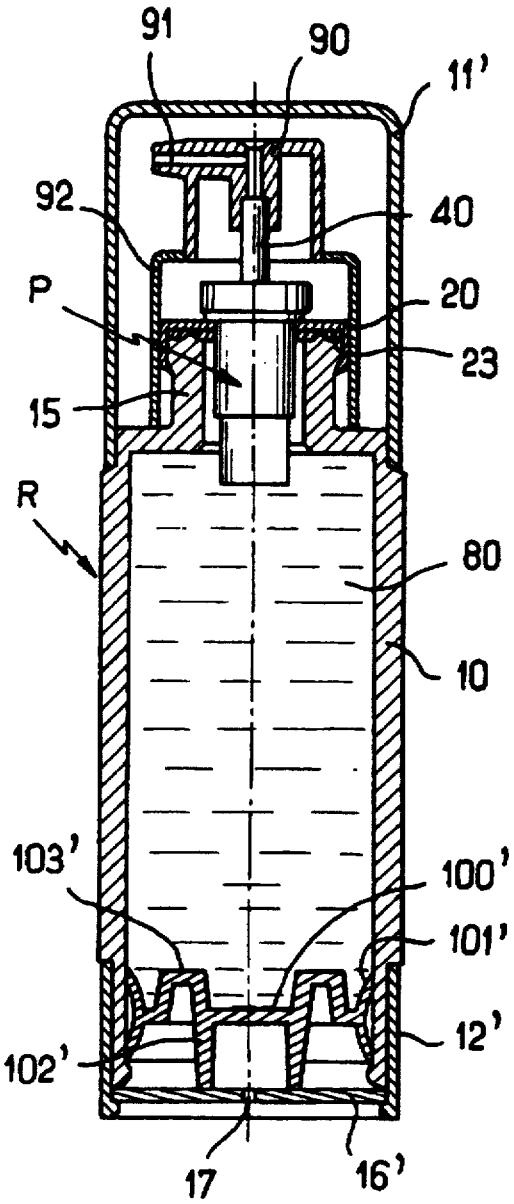
FIG. 22
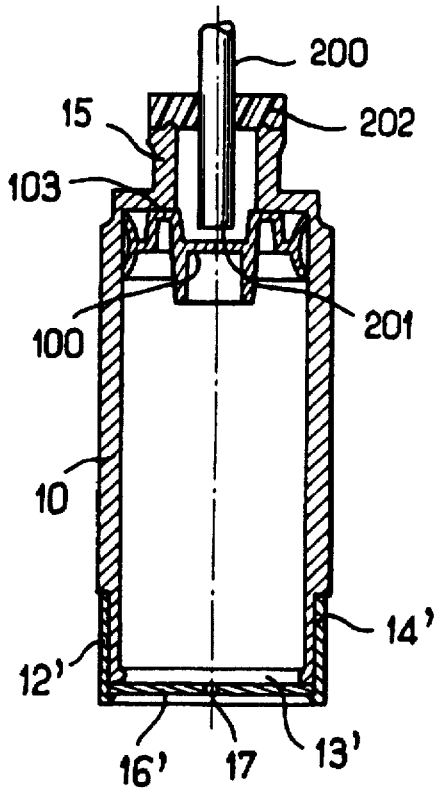
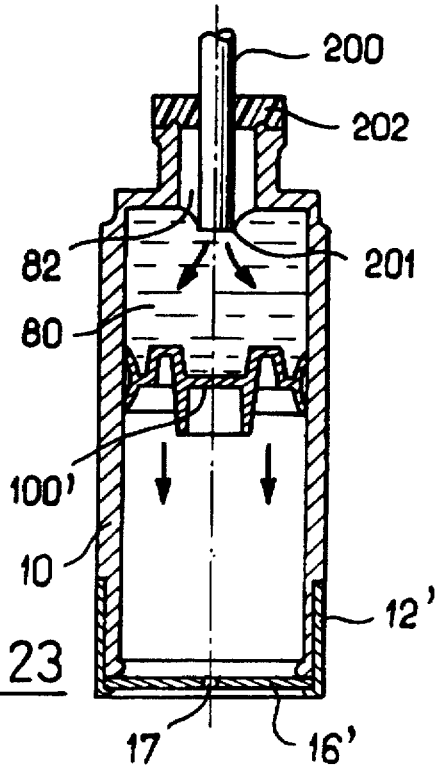
FIG. 23

METHOD OF VACUUM PACKAGING SUBSTANCES, IN PARTICULAR COSMETIC OR PHARMACEUTICAL PRODUCTS, INSIDE VARIABLE-CAPACITY CONTAINERS CLOSED BY DISPENSER MEMBERS, THAT PREVENT INGRESS OF AIR, APPARATUS FOR IMPLEMENTING THE METHOD, AND DISPENSERS OBTAINED THEREBY

Matter enclosed in heavy brackets [ ] appears in the original patent but forms no part of this reissue specification; matter printed in italics indicates the additions made by reissue.

This is a continuation of application Ser. No. 07/605,309 filed Oct. 30, 1990 now abandoned.

The invention relates to a method of vacuum packaging liquid to semi-solid substances such as lotions and creams used for cosmetic or pharmaceutical purposes. It serves in particular to provide dispensers constituted by a variable-capacity container closed by a dispenser pump of the type referred in the art and "airless", i.e. a pump which prevents ingress of air to the container. The means for varying the capacity of the container are provided, inter alia so that when the container is full, it exerts relative pressure on the enclosed substance, thereby ensuring that the substance is properly dispensed from the first time the pump is actuated. These means also serve to ensure that the substance can continue to be pumped out from the dispenser while it is being emptied without any corresponding admission of air. The resulting dispensers for liquid to semi-solid substances are particularly convenient. The invention also relates to apparatus suitable for implementing the method of the invention.

BACKGROUND OF THE INVENTION

In the past, the only types of dispenser for liquid to semi-solid substances in which an air vacuum has been established have comprised a rigid container (such as a glass flask or a metal can) associated with a dispenser member, which member is of the valve type. The corresponding packaging method includes a stage during which the air remaining in the full container is sucked out between the neck of the container and the valve which has been placed thereon but is not yet fixed in place. This has the effect of establishing reduced pressure inside the container while the valve bears hermetically against the neck. A subsequent stage consists in fixing the valve definitively to the neck (by crimping inwards or outwards, . . . ) and this may be done at any moment after suction has been complete. This method is used essentially with dispensers that are maintained under pressure by means of a propellant gas. The temporary vacuum established inside the container serves to leave room for the propellant gas without giving rise to significant excess pressure. The propellant gas is then inserted via the valve that has been fixed on the container.

This prior art method is not suitable for use with variable capacity containers associated with "airless" pumps, i.e. pumps that prevent ingress of air. For example, if the container is a flexible pouch, the suction would have the effect of deforming the container and removing some of the substance. And since the inside of the container remains at atmospheric pressure, the dispenser member would not bear against the neck adequately for sealing purposes. As a result, shortly after suction has ceased, air would get back into the container which would return to its original shape.

Nevertheless prior art methods could be used, providing the dispenser member is fixed in place very quickly after the air has been removed. However, under such circumstances the initial content of the dispenser made in this way is less than the maximum possible capacity of the container. This is because, in practice, some substance is always removed together with the air insofar as it is not possible to adjust the period during which suction is maintained finely. In other words the container is over dimensioned, thereby increasing the cost of the dispenser. The resulting economic loss is particularly perceptible since mass production is generally involved.

An object of the present invention is therefore to provide a method of establishing an air vacuum in a variable capacity container filled with a substance which may be liquid to semi-solid and of fixing a dispenser member thereon without allowing air to get back into the container while the dispenser member is being fixed, while nevertheless maintaining the maximum capacity of the container.

SUMMARY OF THE INVENTION

This is achieved by a method of vacuum packaging a substance having consistency lying in the range liquid to semi-solid inside a variable-capacity container closed by a dispenser member that prevents ingress of air, said method including at least a stage during which said member is fixed in sealed manner on said container while said container is filled with said substance, wherein said member is fixed in sealed manner while said container is inside an enclosure where an air vacuum is maintained.

The present invention also provides deforming the container to increase the volumetric capacity of the container and a container including a neck on which said dispenser member is adapted to be fixed in sealed manner, with said stage of fixing said member in sealed manner being preceded by at least the following stages:

1) said container is disposed in a socket having an open top so that said neck is presented at said top; and
2) said container is filled with said substance via said neck, after which said dispenser member is disposed on said neck;

the apparatus including a ring adapted to bear downwards and in sealed manner on the top of said socket so as to constitute said enclosure, means for sucking air from said enclosure, and means for fixing said dispenser member, said means being disposed in the center of said ring.

Finally, the present invention also provides a dispenser constituted by associating a variable-capacity container and a dispenser member that prevents ingress of air, and in which a substance having a consistency lying in the range liquid to semi-solid is vacuum packaged by the above-specified method, such that once said member has been fixed on said container, the entire maximum capacity thereof is occupied by said substance to the exclusion of any quantity of air, in particular any air remaining around said member.

The advantages of the present invention lie not so much in the method and the apparatus which implements the method, but more particularly in the dispensers obtained thereby. Firstly, the substance contained in the dispensers remains permanently protected from the air. There is no risk of it oxidizing, of it being contaminated, or of it drying out and hardening, all of which are undesirable from the point of view of the quality of the substance as dispensed and also from the point of view of being able to dispense the substance at all.

Dispensers obtained using the present method are particularly advantageous when the containers are capable of being deformed prior to filling in order to increase their capacity. When the dispenser member is fixed in sealed manner thereon, the disappearance of the prior deformation causes the substance contained inside the container to be put under pressure since the capacity of the container tends to diminish. This compression is reinforced by the vacuum established therein since it causes atmospheric pressure to compress the walls of the container that much more. As a result, priming the dispenser member is greatly facilitated. This is particularly precious for semi-solid substances since bubbles of air are substantially eliminated. As a result the present method makes it possible to develop dispensers providing performance in many ways that cannot be achieved otherwise.

BRIEF DESCRIPTION OF THE DRAWINGS

Implementations of the invention are described by way of example with reference to the accompanying drawings, in which:

FIGS. 1 and 2 are respectively a front view and a side view, each in partial section;

FIG. 3 is a top view; and

FIG. 4 is a section on plane III—III of FIG. 1;

FIG. 12 shows a vacuum being established inside the enclosure containing the container; FIG. 13 shows the pump being put into abutment; and FIG. 14 shows the pump being crimped into place;

FIG. 16 is an axial section; and the clamping hooks of the assembly are shown as seen from beneath in FIG. 15;

FIG. 21 is an axial section through a third dispenser of the invention;

FIGS. 22 and 23 are axial sections through the FIG. 21 dispenser shown respectively at the beginning of container filling and during container filling;

DETAILED DESCRIPTION

Figure 1:
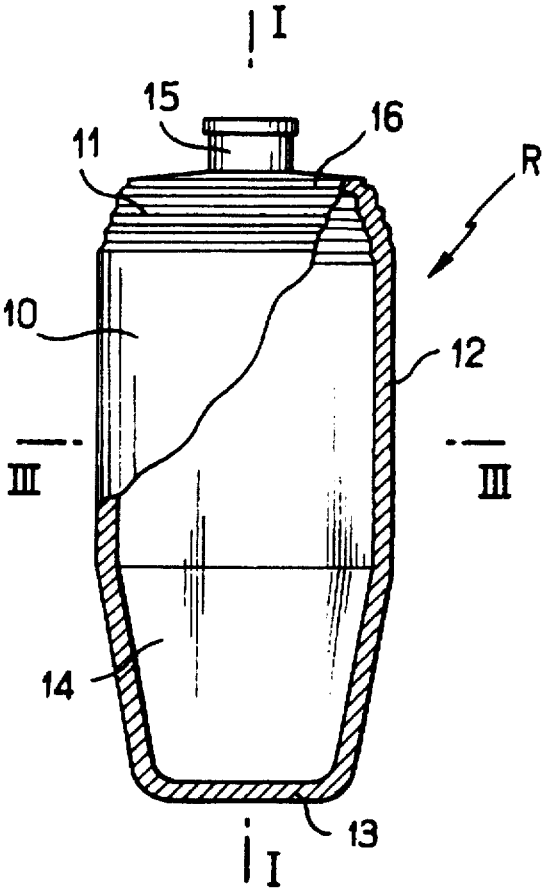
FIGS. 1 to 4 show a deformable container advantageously used for forming a dispenser of the invention.
Figure 2:
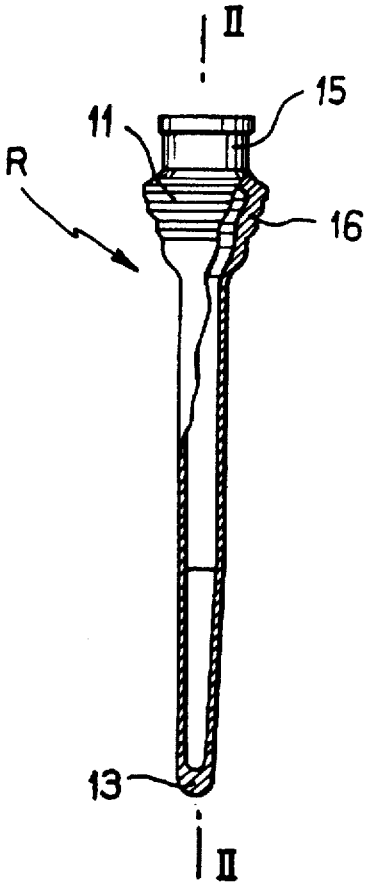
Figure 3:
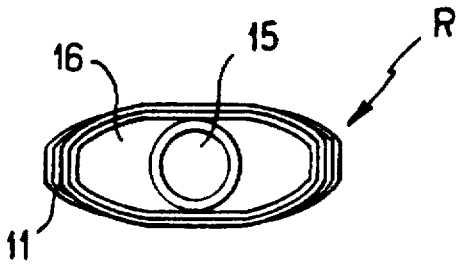
Figure 4:
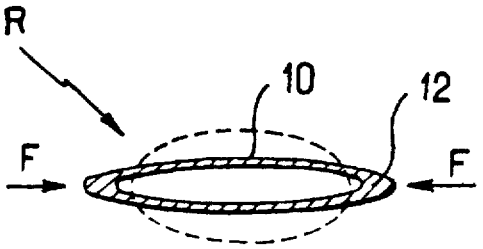

Wherever possible, identical reference numbers are used throughout to designate items performing the same functions in the various different dispensers.

FIGS. 1 to 4 are respectively a front view, a side view, a top view, and a cross-section through a variable capacity container advantageously used in the context of the present method for packaging a liquid to semi-solid substance. A container of comparable type is already disclosed, inter alia, in European patent application No. 0 324 289 filed Oct. 24, 1988 by S.T.E.P. Typically, the container comprises a body in the form of a pouch 10 which is generally flat when at rest with a tapering portion 11 which is nearly elliptical and which is terminated by a cylindrical neck 15. The pouch and the neck are manufactured integrally, e.g. out of a flexible plastics material such as polyethylene or polypropylene. The tapering portion 11 and the neck 15 are thick enough to be relatively rigid, whereas the wall of the remainder of the pouch 10 is, on the contrary, capable of being relatively thin. Nevertheless, the sides 12 and the bottom 13 of the pouch 10 are reinforced by folds or ribs like the tapering portion 11. This can be seen more clearly in FIGS. 1 and 2 where the container is shown partly in section (respectively in plane II—II of FIG. 2, and in plane I—I of FIG. 1).

This structure imparts special deformation properties to the container. Once a force F is applied thereto to move its side folds 12 towards each other (as represented diagrammatically in FIG. 4 which shows the container in section on plane III—III of FIG. 1), each of the thin-walled faces of the pouch bulges outwards (as shown by dashed lines in FIG. 4). This gives rise to an appreciable increase in the inside volume of the container.

Figure 5:
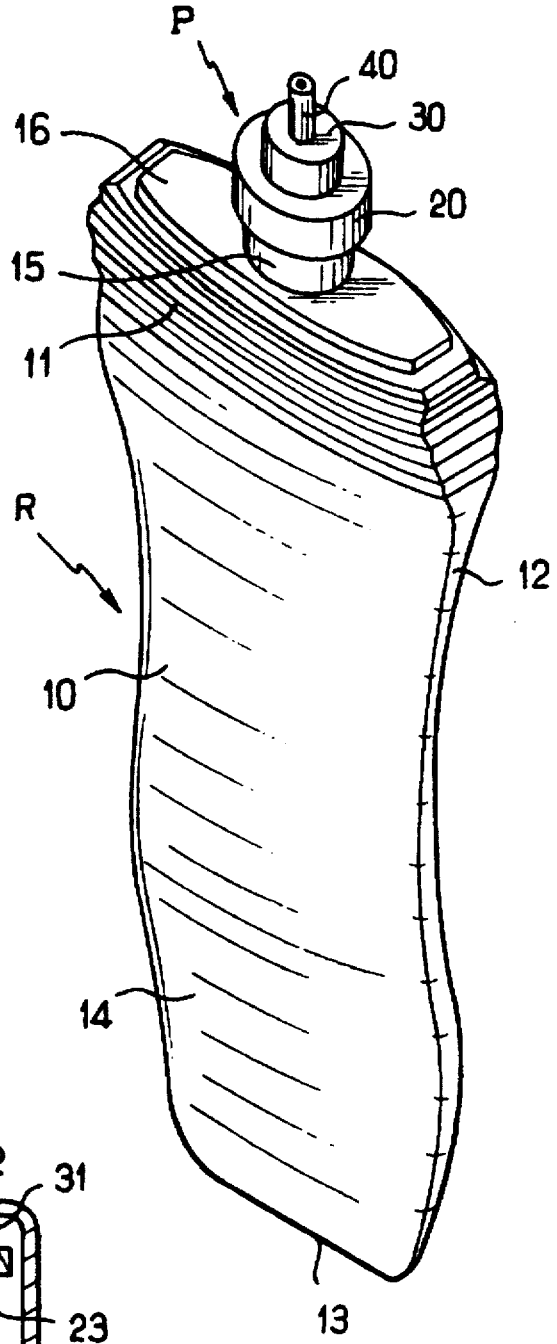
FIG. 5 is a perspective view of a first dispenser of the invention including, inter alia, the container of the preceding figures.

It is advantageous to fill the container while it is held in the deformed state. Likewise, it is preferably held in this state while being hermetically closed by a dispenser pump P. When the external force is released, a dispenser is obtained whose overall appearance is shown in FIG. 5. By virtue of its relative stiffness, the tapering portion 11 retains a shape which is suitable for receiving a cover that is engaged on end wall 16. Simultaneously, the pouch 10 remains deformed since the substance trapped inside it prevents it from returning to its flat rest shape. The substance is thus maintained under pressure by reaction inside the container 10.

Having this pressure is an advantage for ensuring that the substance is properly dispensed by the dispensing pump P. Dispensing is generally obtained by pressing down the hollow rod 40 of the pump P into turret 30. The pressure existing inside the container then serves not to expel the substance (that is the function of the pump) but to facilitate priming the dispenser member.

Figure 6:
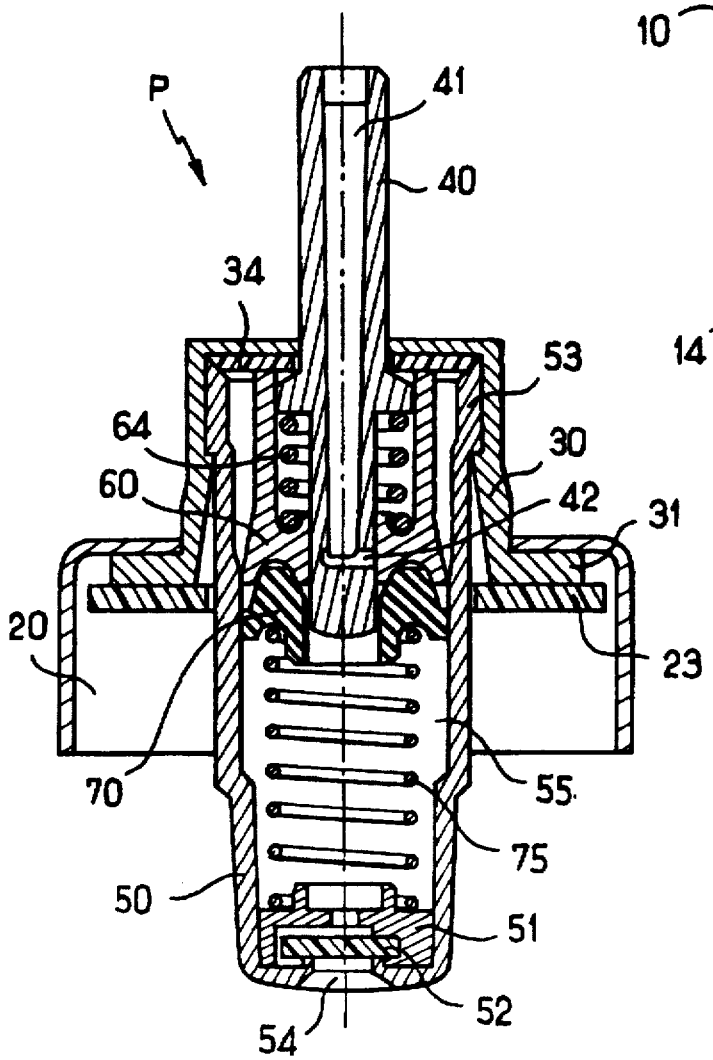
FIG. 6 is an axial section through a precompression pump that prevents ingress of air and which is advantageously used in association with the container of FIGS. 1 to 4 to form a dispenser of the invention.

Although it may be possible to use a pump that does not have precompression, it is advantageous to use a pump of the type shown in axial section in FIG. 6. This pump constitutes the subject matter of French patent No. FR 2 343 137 filed in 1976 by Valois. It is conventionally constituted by a pump body 50 having one end (the bottom end in the figure) inside the container and communicating therewith via an opening 54. The pump body 50 does not have an air ingress orifice as is sometimes provided when it is appropriate to replace a dose of dispensed substance with a quantity of air. In the art, this type of pump which prevents ingress of air is referred to as being "airless". Similarly, no provision is made for a dip tube to convey substance from the bottom of the container to the opening 54 in the pump body 50 since the small thickness of the container does not leave room for such a tube inside the container. The opening 54 may be closed by a gasket 52 which is partially held by a ring 51 jammed at the bottom of the pump body 50, with the gasket thus operating as an inlet valve to the pump chamber 55.

The other end 53 (at the top in the figure) of the pump body 50 is open. It receives a piston 60 which slides in sealed manner inside the body 50 so as to isolate the pump chamber 55 from the outside. A return spring 75 is disposed between the ring 51 and the piston 60 to oppose any reduction in the volume of the pump chamber 55. In order to form an outlet valve from the chamber 55, the pump shown in FIG. 6 provides for co-operation between the hollow rod 40 used for actuating the pump, the piston 60, and a ring 70 which is held against the piston 60 by means of the return spring 75. In this co-operation, another spring 64 which is less compliant than the return spring also serves to oppose relative displacements between the hollow rod 40 and the piston 60.

Thus, when the pump chamber 55 is full of substance, depressing the rod 40 begins by displacing the piston 60 and the ring 70. As its capacity is reduced, the pressure inside the chamber 55 increases with the admission valve thus remaining closed. Very quickly, the pressure reaches a so-called "precompression" pressure beyond which further depression of the rod 40 ceases to entrain the piston 60, and instead the spring 64 is compressed. As a result side channel 42 through the rod 40 becomes disengaged from the piston 60 so that channel 41 inside the rod is put into communication with the pump chamber 55. The contents of the pump chamber is thus ejected forcibly to the outside until the ring 70 meets the ring 51.

As soon as the hollow rod 40 is no longer actuated, the spring 64 expands. The outlet valve from the pump chamber 55 then closes, since the side channel 42 returns back inside the piston 60 and the ring 70 reinforces the sealing pressure between the piston and the rod 40. Thereafter the return spring 75 expands in turn. This increases the volume of the pump chamber 55. The suction that this gives rise to relative to the content of the container is immediately compensated by substance being admitted through the opening 54.

In order to be capable of operating as described above, a turret 30 is provided to offer the necessary abutment. It also serves to isolate the open end 53 of the pump body 50 from the outside. A gasket 34 is disposed for this purpose between the turret 30 and the pump body 50, with the hollow rod 40 passing therethrough with a degree of clearance. This makes depression of the piston and the rod possible by admitting air into the pump body 50, while simultaneously preventing this air from penetrating into the container.

Finally, in the version of the precompression pump shown in FIG. 6, a crimping collar 20 is disposed to pass over a base flange 31 on the turret 30. The collar 20 is intended to fit over the neck 15 of a container with the gasket 23 then bearing against the neck. It is explained below how the collar 20 makes it possible to fix the precompression pump of FIG. 6 on a container, or more generally how it makes it possible to fit any pump P that prevents ingress of air, in a manner which is sufficiently hermetically sealed to ensure that there is no significant exchange between ambient air and the air inside the container throughout the lifetime of the dispenser made in this way.

In practice, the variable capacity containers described above are made by blow-molding. This means that dimensions may vary from one container to another. Further, they are generally filled using a metering cylinder whose content also varies from one delivered dose to another. These factors mean that it is not possible to fill containers exactly level with the necks thereof, and as a general rule they are not filled completely.

Thus, if a pump as described above is fixed on a container without taking any additional precautions, air will necessarily be left surrounding the pump body. The pressure exerted by the container wall on its semi-solid content is inadequate for expelling this air sufficiently. It only manages to cause a small quantity of the air to penetrate into the pump chamber 55 via its admission valve. This quantity serves merely to increase the quantity of air initially to be found in the chamber.

In this situation where the chamber does not contain any of the substance to be dispensed, experience shows that it is practically impossible to prime the pump if the consistency of the substance to be dispensed is not completely liquid. On the first occasion that the rod 40 is actuated, the air initially in the chamber 55 is compressed as the volume of the chamber is diminished. However, because air is highly compressible, its pressure does not increase sufficiently to oppose the spring 64. The outlet valve of the pump therefore remains closed. Thereafter, when the pump chamber returns to its maximum volume, insufficient suction is developed therein to open its admission valve. In other words, the pump chamber remains permanently empty of the substance to be dispensed and the corresponding dispenser is incapable of giving satisfaction to its user.

As a result, the above-described dispenser comprising a special variable-capacity container in association with a precompression pump is a viable product only if all of the air remaining in the container full of substance is expelled during manufacture of the dispenser. The present method of vacuum packaging serves to achieve this result. It is described in detail below. It may be observed that although this method is equally applicable to other kinds of container and dispenser member, the method is initially described only in association with the preferred dispenser as described above.

Figure 7:
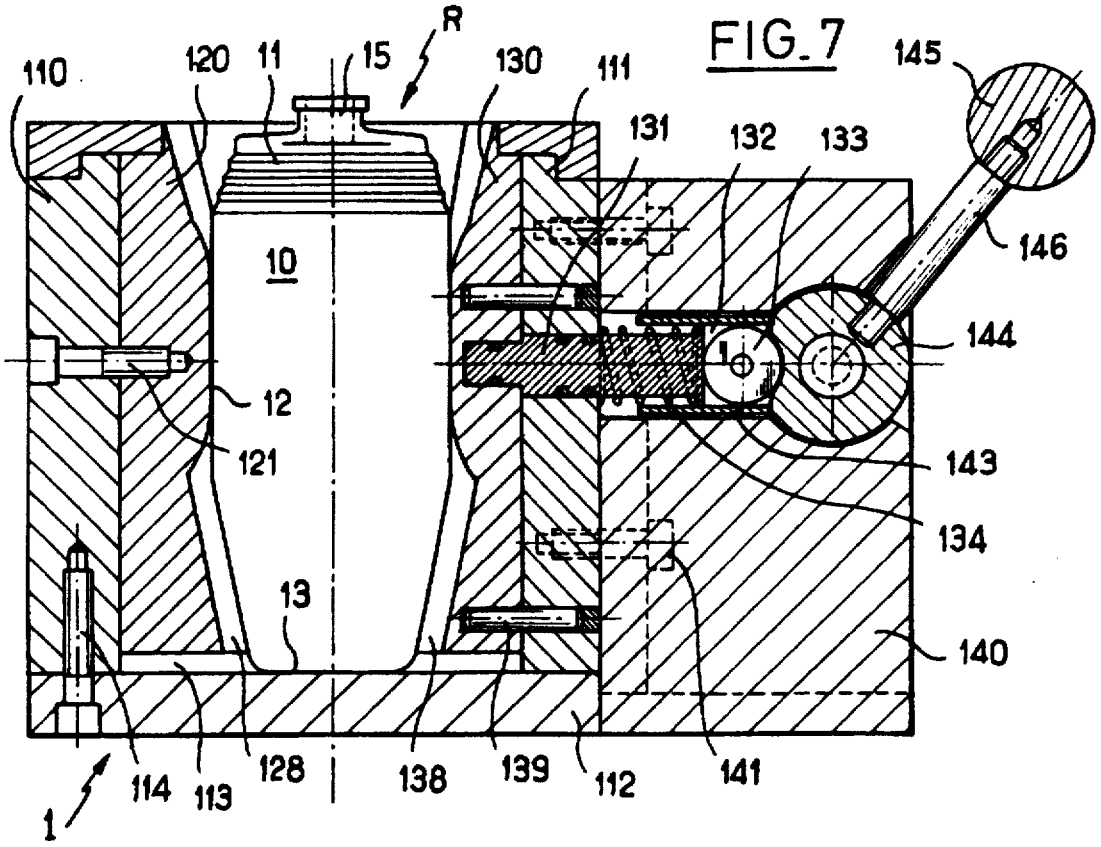
FIGS. 7 and 8 are a longitudinal section through a socket advantageously used in the method of the invention for compressing a container such as that shown in FIGS. 1 to 4, the vice contained in this socket is shown with its jaws open in FIG. 7 and with its jaws closed in FIG. 8.

The first stage of the method of the invention consists in mechanically deforming the container R. To this end, use may be made of a small device shown in longitudinal section in FIGS. 7 and 8. This device comprises a vice 1 constituted by two adjacent portions. The first of these portions is an opentopped socket 110 made, for example, of aluminum alloy. In particular, FIG. 7 shows two opposite vertical sides 111 and a bottom 112, with the sides 111 being fixed to the bottom 112 by assembly dowels 114. Two jaws are disposed inside the socket 110 adjacent to respective ones of the two sides 111. One of these jaws (referenced 120) is fixed to the socket 110, e.g. by an assembly dowel 121. The other jaw (referenced 130) is a moving jaw and is capable of moving in translation inside the socket 110 parallel to its bottom 112.

To make this possible, one of the faces of the jaw 130 includes plungers 139 suitable for being received in holes extending perpendicularly through that side 111 of the socket against which the jaw 130 is disposed.

Similarly, a cylindrical rod 131 is fixed to the jaw 130 and passes through the side 111. It is extended outside the socket 110 to terminate in a larger diameter head 132. The head holds a wheel 133 captive in such a manner that a portion thereof projects from the end of the head 132. Finally, the rod 131 is surrounded by a spring 134. The spring bears firstly against the outside surface of the side 111 and secondly against the shoulder formed on the head 132. The spring 134 therefore permanently urges the rod 131 out from the socket 110, i.e. it tends to apply the moving jaw 130 against the side 111 as shown in FIG. 7.

Figure 8:
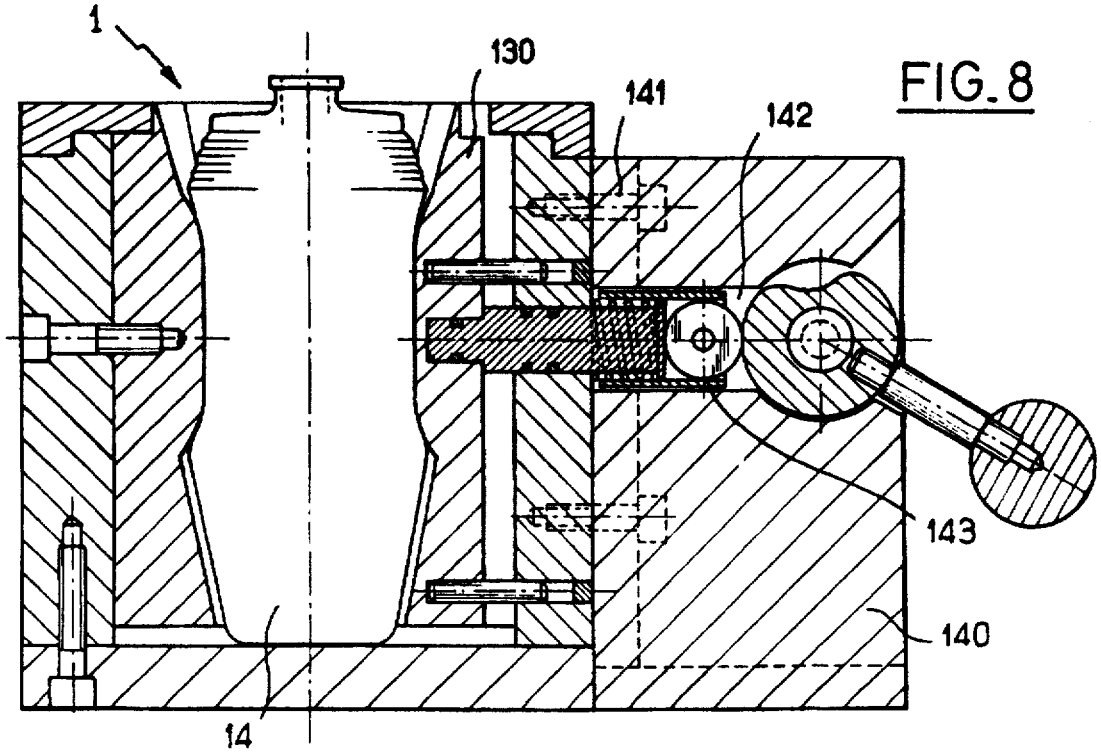

In order to move the jaw 130 from this position to the position shown in FIG. 8 where the jaws are closer together, the vice may include a second portion constituted by a block 140 fixed to the side 111 through which the rod 131 projects (by means of dowels 141 as shown in dashed lines). The block 140 has a through hole 142. A first length of the hole 142 is adapted to receive the portion of the rod 131 which projects out from the socket 110, and including its head 132. A cylindrical protective sleeve 143 is then advantageously interposed therebetween in order to ensure that the rod 131 slides properly. Beyond the head 132, the hole 142 expands to receive a cam 144 whose overall shape is cylindrical. The cam 144 has a notch in which the emerging portion of the wheel 133 in the head 132 can be received. Thus, depending on whether the wheel 133 penetrates into the notch of the cam 144 (FIG. 7) or is merely in contact with the cylindrical outside surface of the cam 144 (FIG. 8), the rod 131 is thrust to a greater or lesser extent into the socket 110. For the purpose of actuating the cam 144 manually, it is advantageous to fix a lever 146 thereon (e.g. by a force-fit) with the lever projecting outside the block 140. The lever may be terminated by a knot 145.

Figure 9:
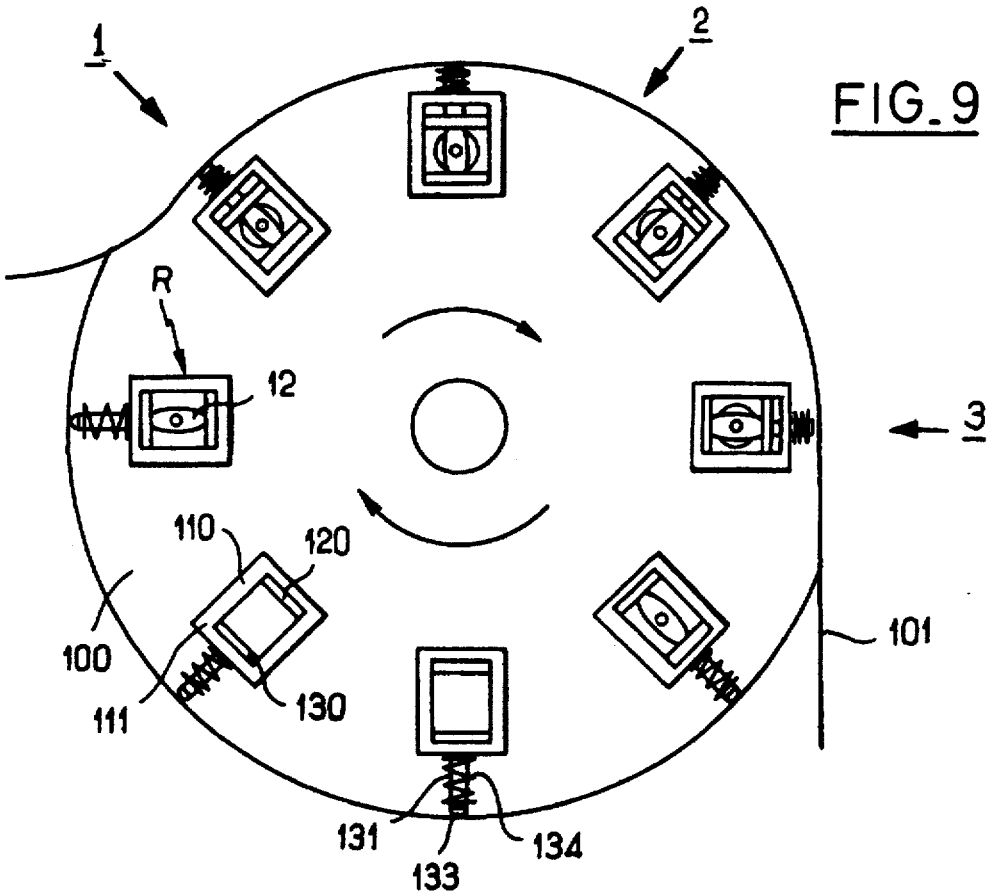
FIG. 9 is a plan view of a carousel advantageously used in the method of the invention.

However, the block 140 with its cam 144 and its lever 146 are more particularly suitable for implementing the vice 1 in a laboratory. In industrial utilization, a plurality of sockets 110 are advantageously disposed radially around a carousel 100 as shown in FIG. 9 which is a diagrammatic plan view. In this case the sockets are no longer fitted with the block 140 and the rods 131, and their springs 134 and wheels 133 are completely uncovered outside the sides 111 of the sockets. It is then possible to provide a camming strip 101 disposed at the same level as the various wheels 133. The distance between the strip and the axis of rotation of the carousel is such that when the wheels 133 bear against the strip they thrust the rods 131 into the sockets, consequently moving the corresponding vice jaws 1 together in pairs.

In this case, the strip 101 preferably occupies only a portion of a turn round the carousel. Thus, while traveling at a distance from the strip 101, a socket 110 keeps its jaws 120 and 130 at maximum spacing. This spacing is designed so that a container of the kind described above can be inserted into a socket 110 through its open top. The side folds 12 thereof are then disposed against the jaws which may optionally include guide grooves 128 and 138 for this purpose. Similarly the bottom 13 of the container is advantageously received in a groove 113 for holding it in place (see FIG. 7).

Thus, when the socket is presented to the strip 101, the container R is deformed as described above. FIG. 8 is a side view showing the shape then taken up by the container R, and in this view it can be seen that force is applied only to the middle of the side folds 12 (via appropriate projections on the jaws inside the grooves 128 and 138). The bottom ends of the folds 12 taper to facilitate inserting a container into a socket. No provision is made for the corresponding bottom portion 14 of the pouch 10 to participate significantly in overall deformation.

Figure 10:
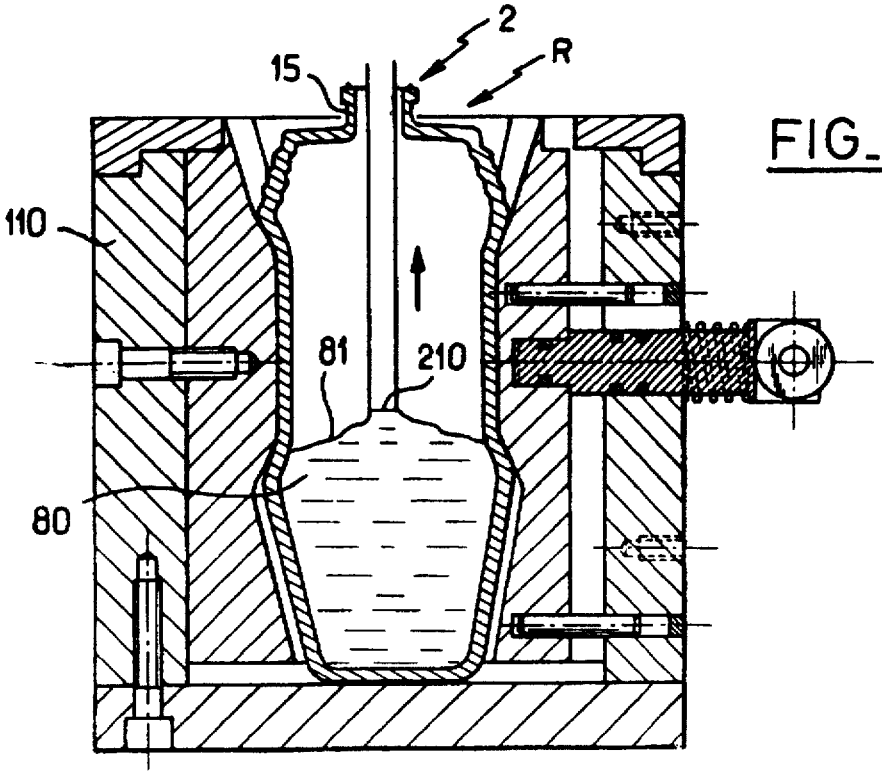
FIG. 10 is a longitudinal section through the socket of FIGS. 7 and 8 showing the socket holding a container while it is being filled.

After an initial container-deforming stage (which occurs, for example, when the associated socket moves to position 1 shown in FIG. 9), the second stage of the present method takes place. This is the stage during which the container is filled with substance. Filling is advantageously performed by means of a filler head represented in FIG. 10 solely by a pipe 2. The filler head may be disposed, for example, above the carousel of FIG. 9 in the position marked 2. In other words, the container is presented to the filler head while being deformed by the corresponding socket engaging the strip 101. Advantageously, the injector 2 is initially lowered to the bottom of the container by passing through its open neck 15. Then, as the substance 80 flows into the container, the injector pipe 2 is raised so that its end 210 remains continuously above the surface 81 of substance. Alternatively, the socket 110 is lowered relative to a fixed injector pipe 2. In either case, keeping the injector 2 out of the substance 80 prevents air bubbles being trapped. Finally, nearly all of the capacity of the deformed container is filled with a mass of substance 80 leaving only a small volume of air remaining in the vicinity of the neck 11 in a space marked 82 in FIG. 11.

Figure 11:
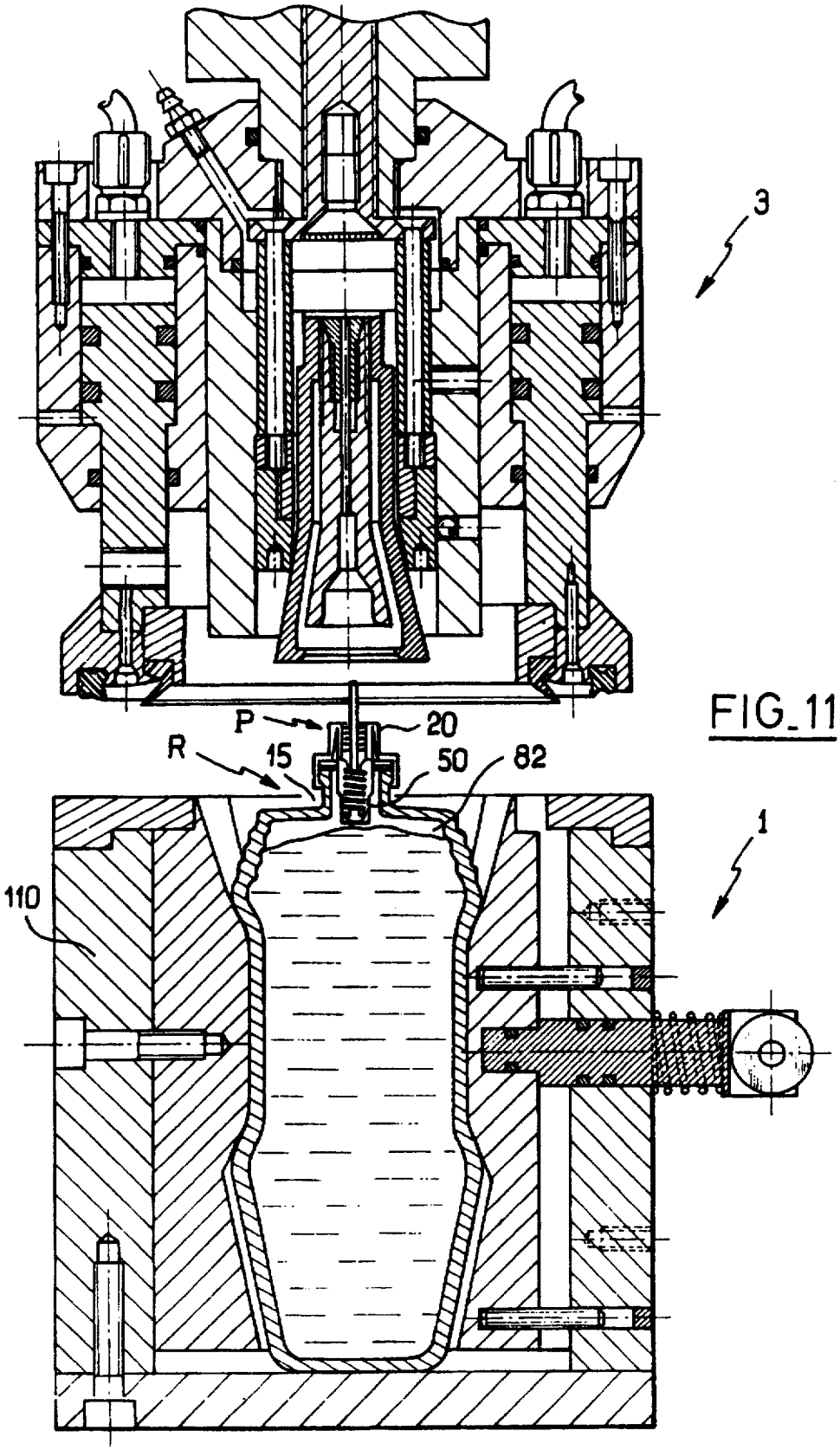
FIG. 11 is a section similar to FIG. 10 with the container being shown full, and with apparatus of the invention being shown in axial section above the socket.

The dispenser member is then put into place on the container R. When the dispenser member is constituted by a pump as shown in FIG. 6 and also as shown in FIG. 11, the pump body 50 is engaged inside the neck 15 of the container and its crimping collar 20 merely rests on the neck. Thereafter, the socket 110 is brought to position 3 in FIG. 9 and is subjected to the third and last stage of the present method. This happens while the container is beneath a final packaging apparatus 3. One example of this apparatus 3 is shown in various different positions in axial section in FIGS. 11 to 14. The principle on which such apparatus of the present invention is described below. Without going into details of all of its component parts, its main groups of components are described from a functional point of view as the description of the implementation of the present apparatus progresses. Except where required for operation of the apparatus, the main function of the various components in each group is to facilitate assembly of the apparatus. While describing the apparatus, the sequences of the third stage of the present method as performed by the apparatus 3 are described.

Figure 12:
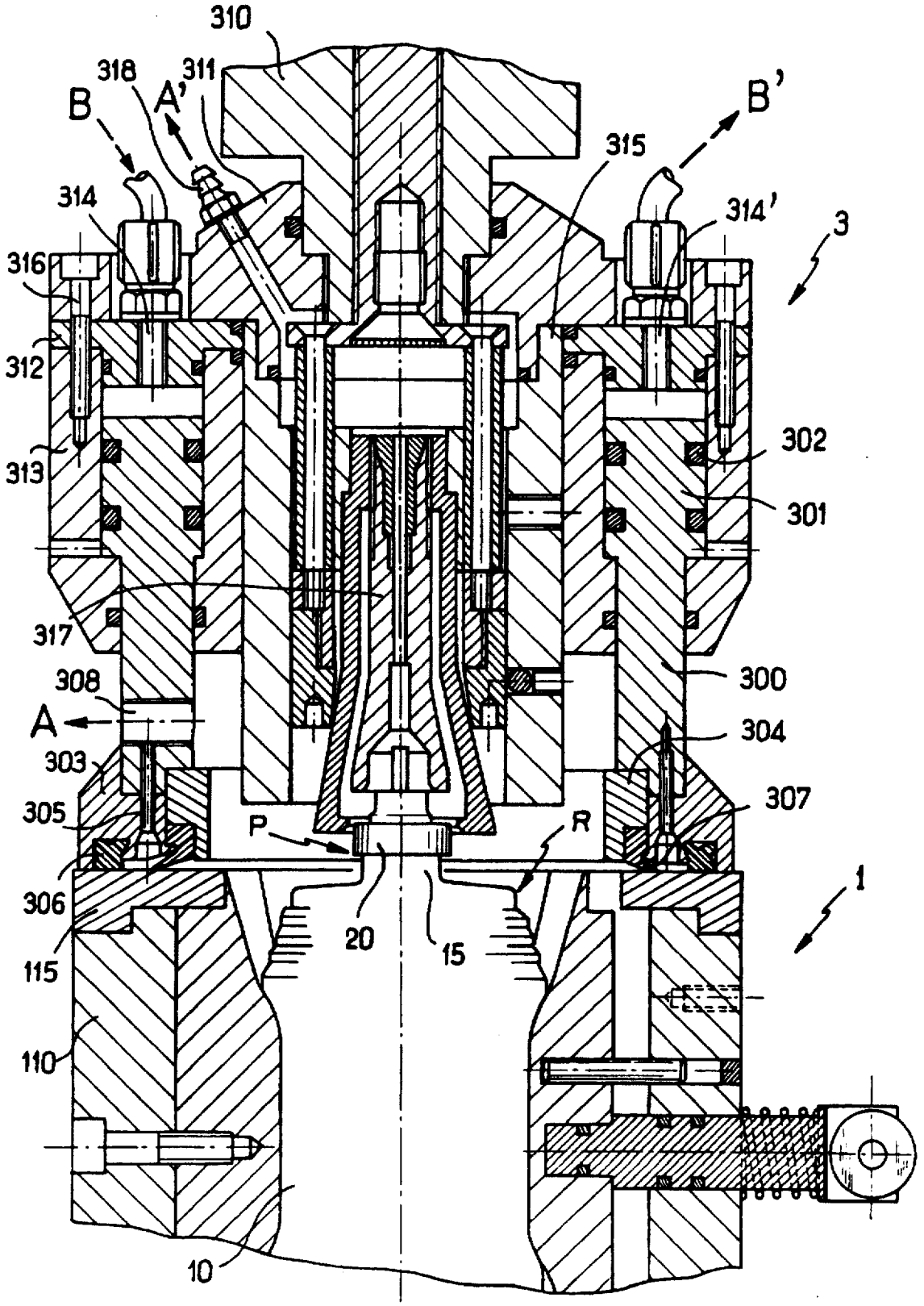
FIGS. 12 to 14 show the apparatus of FIG. 11 in various different stages while a dispenser pump is being fixed on a container of the invention.

Thus, once the socket 110 together with its deformed container R full of substances 80 and provided with the pump P which has not yet been crimped on is presented beneath the apparatus 3, as shown in FIG. 11, the apparatus 3 and the socket 110 are displaced relatively towards each other to take up the position shown in FIG. 12. To do this, a first actuator 310 serves, for example, to lower the set of components having reference numbers in the range 311 to 319 and constituting the head of the apparatus 3. Such an actuator advantageously constitutes a part of a machine as is conventionally used for assembling dispensers.

The head of the apparatus 3 then entrains components having references 300 to 308 and constituting a kind of bottom ring. To do this, air under pressure is injected via a duct 314 (arrow B). Some of the air may be removed via duct 314' (arrow B') symmetrically disposed about the axis of the apparatus 3. Overall, care is taken to maintain the pressure at a value which is high enough to ensure that the head of the apparatus (components 310 to 319) and its bottom ring (components 300 to 308) are kept at a distance from each other.

As a result, the bottom ring ends up encountering the top of the socket 110. Contact is preferably established via a shock absorbing ring 306 engaging an annular part 115 of the socket. Although present in the drawings described above, this part 115 is not described above. It enables the socket 110 to provide a circular rim against which a sealing lip 307 carried at the bottom of the apparatus 3 may be engaged. The air pressure maintained between the head and the bottom ring by means of the ducts 314 and 314' then guarantees that the ring 300 bears against the socket 110 with a force which is higher than that developed by the actuator 310.

This ensures that the space inside the socket 110 and the apparatus 3 is isolated from the outside. Thereafter a vacuum is established in the corresponding enclosed space or "enclosure" by applying suction via ducts 308 (arrow A close to the base of the bottom ring) and 318 (arrow A' close to the head of the apparatus 3). The inside space thus put at reduced pressure includes not only the periphery of the container R, but also the space 82 inside the container R which communicates with the periphery of the container around the pump P which is not yet crimped into place (cf. FIG. 11). Given the preferred pump structure, communication is naturally established between the neck 15 and the crimping collar 20 since the mechanical and hydraulic conditions that apply should, a priori, prevent the outlet valve from opening. In any event, unwanted air is removed from the space 82.

Figure 13:
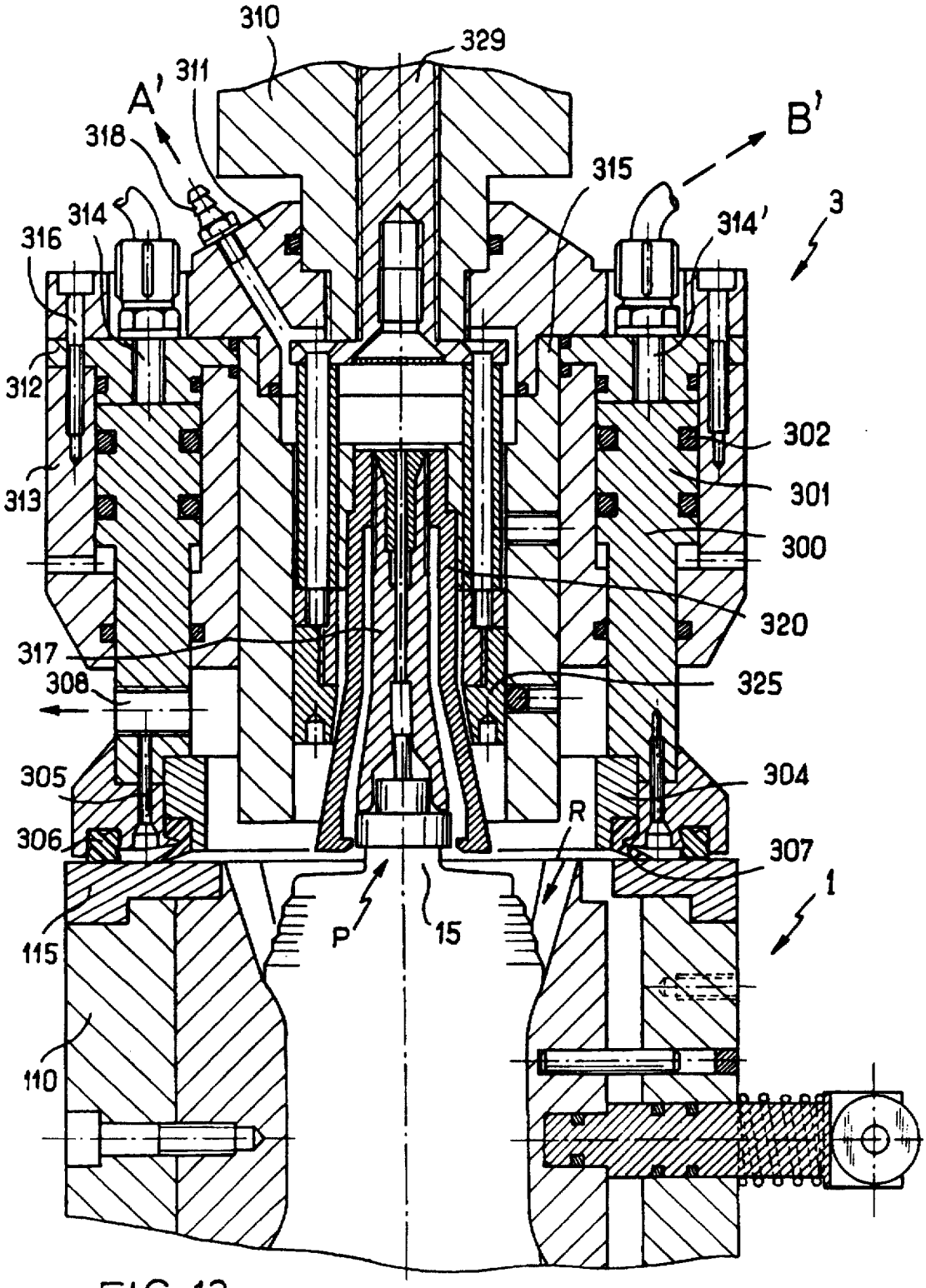

While suction is maintained on ducts 308 and 318, the head of the apparatus 3 is lowered a little further towards the socket 110 by switching off the pressure air feed via the duct 314 (see FIG. 13 where arrow B is omitted). The air initially inserted between the head of the apparatus and its bottom ring for the purpose of holding these two groups of components apart thus escapes via the duct 314'. The system then operates as a leakage shock absorber. In order to increase the shock-absorbing effect, a flow rate control valve (not shown) may be disposed at the outlet from duct 314' in order to control the rate at which the air escapes.

As a result, the central component 317 of the apparatus 3, constituting a centering device, is caused to engage the dispenser pump P with all the necessary precautions being taken to prevent the pump jamming. When the leakage shock absorber reaches the end of its stroke, the pump P is thus in abutment against the neck 15, with the periphery of the centering device 317 bearing against the crimping collar 20. The thrust force is selected so that the gasket 23 disposed between the collar and the neck (see FIG. 6) is slightly compressed in order to obtain optimum sealing.

Figure 14:
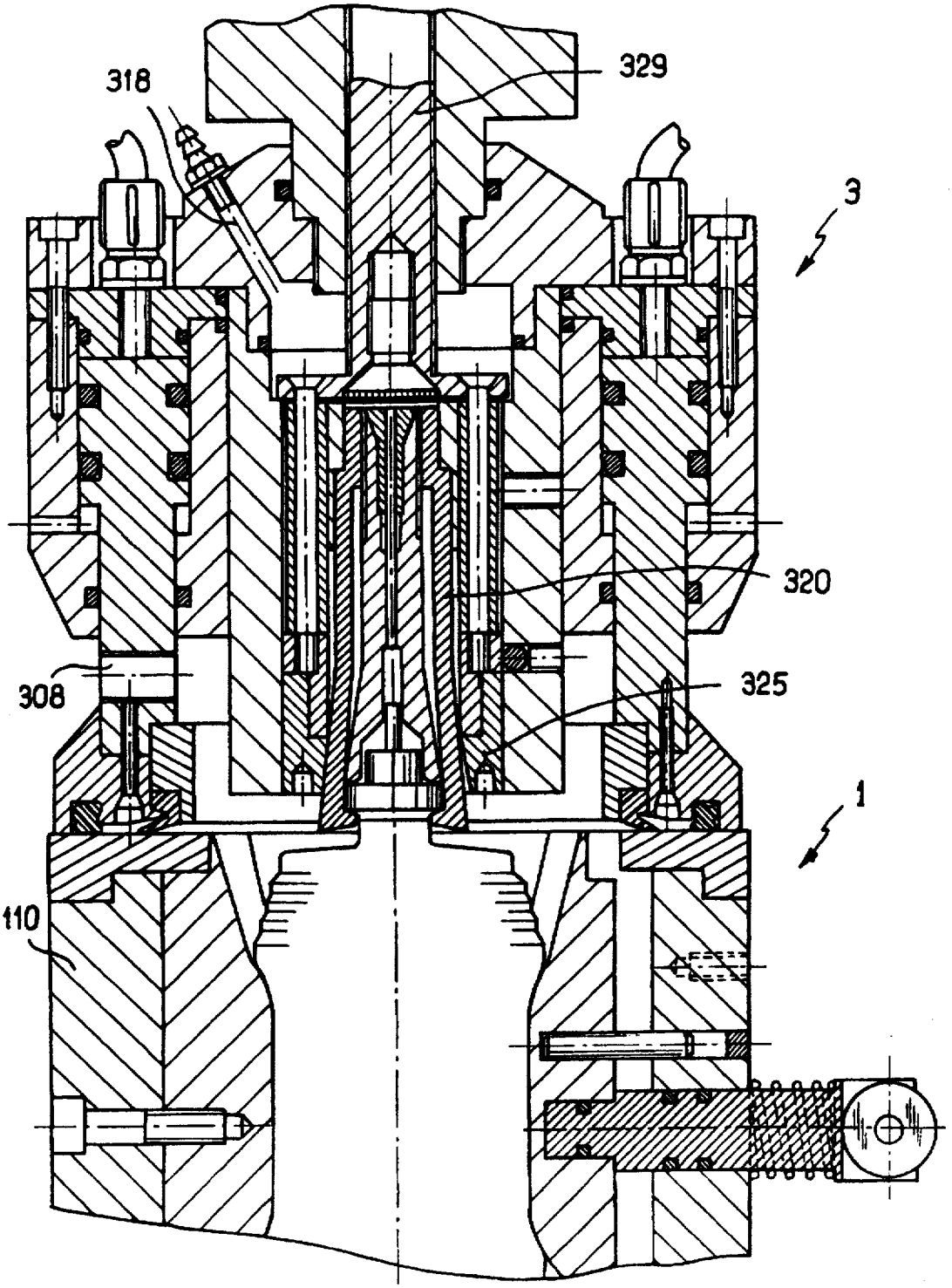
Figure 15:
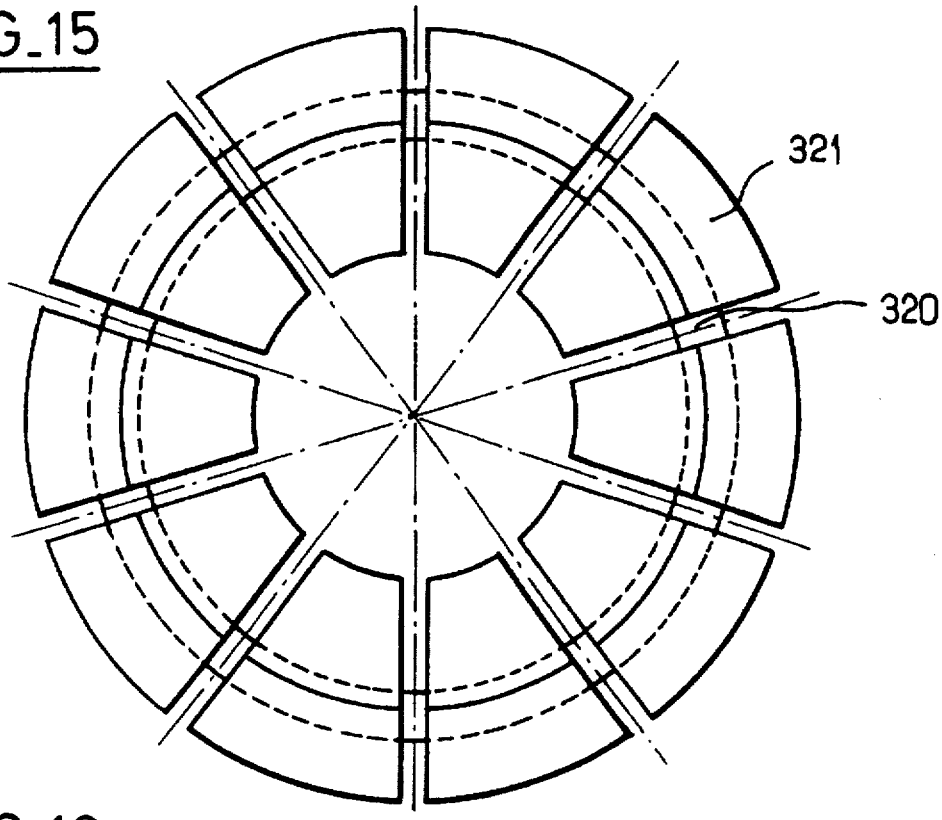
FIGS. 15 and 16 show details of the pump crimping assembly included in the apparatus of the invention shown in FIGS. 11 to 14.
Figure 16:
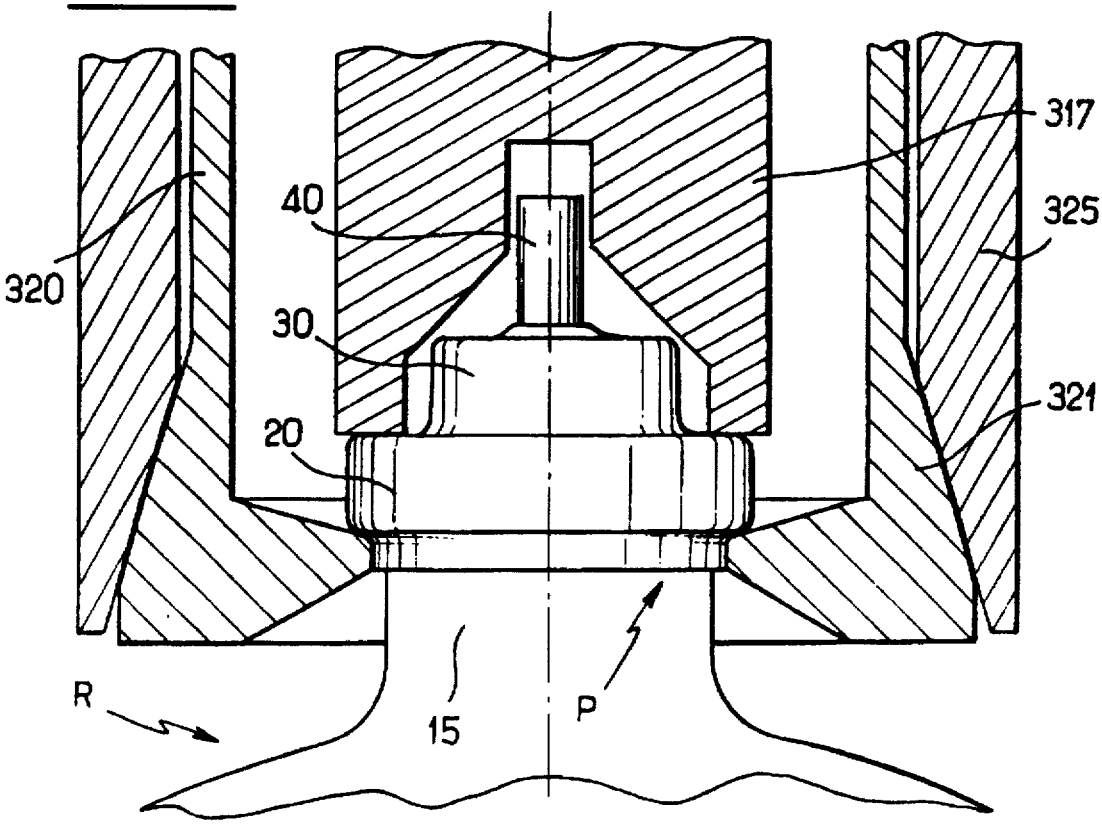

It is from this moment that a third group of components, referred to below as the crimping assembly, is brought into play in apparatus 3 of the present invention. In FIG. 14, these components have reference numbers in the range 320 to 329. They are disposed for the most part in the vicinity of the axis of symmetry of the apparatus. When comparing their relative positions in FIGS. 14 and 13, there can be seen:

a central rod 329 lying on the axis of the apparatus and adapted to slide therealong so as to be suitable for being lowered relative to the head, with rod lowering being controlled by a second actuator (not shown) fixed to the conventional machine mentioned above and capable of being operated in comparable manner to the first actuator which actuates the head;

a cylindrical sleeve 325 or closure cone disposed about the same axis as the apparatus and rigidly connected to the rod 329 so that when the rod is lowered, so is the sleeve; and crimping hook clamps 320 which are fixed to the head of the apparatus and which are described in greater detail below with reference to FIGS. 15 and 16.

In entirely conventional manner, these clamps 320 are in the form of a thin metal cylinder having a considerable end length with radial cuts at uniform spacing around the cylinder. The cuts thus separate tongues 320 which are thin enough to be radially flexible. For example, the clamps shown as seen from below in FIG. 15 comprise ten tongues separated by ten cuts. The free ends of the tongues are of greater thickness than their flexible walls. Externally they co-operate to form a flared truncated cone. Internally each tongue has a tooth-shaped section.

Thus, after the leakage shock absorber constituted by the head of the apparatus and its bottom ring has been pushed down fully, the toothed ends of the tongues 321 are disposed around the dispensing pump P level with the edge of the crimping collar 20. This is the position shown in FIG. 13. Thereafter, the second actuator lowers the rod 329 and the sleeve 325. The sleeve 325 then causes the various tongues 321 of the clamp 320 to move towards one another. As the cuts that separate the tongues close up, the outside diameter of the cylinder formed by the tongues taken as a whole is reduced. The small teeth end up bearing against the rim of the collar. Assuming that the distance between the tips of the teeth and the bottom periphery of the centering device 317 which provides a bearing surface is chosen appropriately, the collar is thus crimped inwards against the lip around the mouth of the container neck, as shown in greater detail in FIG. 16. Thereafter, by virtue of this crimping, the collar isolates the inside of the container from the atmosphere and air suction via the ducts 308 and 318 can be switched off without any risk of air returning to the space 82. From this moment, the substance contained inside the container is put under pressure by ambient air compressing the deformable walls of the container. This contributes to reducing the space 82.

Thereafter, the sleeve 325 and the rod 329 should be raised to release the dispenser from the constriction of the clamp 320. Then the entire head of the apparatus together with its bottom ring can be raised. The socket 110 can then continue its displacement with the carousel, thereby finally disengaging the strip 101 so that its jaws 120 and 130 move apart. At this point, since the container pouch is no longer held in its deformed configuration, the pressure applied to the substance it contains is increased. The space 82 disappears altogether and the substance is automatically admitted into the pump chamber via its admission valve. In other words, the problem of priming precompression pumps as described with reference to FIG. 6 is solved.

However, cases also exist where such automatic preliminary filling of the pump chamber is undesirable. This applies in particular when a pusher is subsequently to be fitted onto the actuator rod 40 of the pump. This fitting operation includes depressing the rod 40, which therefore gives rise to the contents of the pump chamber being dispensed. It will readily be understood that under such circumstances it is desirable for the initial contents to be a gas so as to avoid dirtying the pusher with substance to be dispensed and so as to keep the packaging line clean.

Figure 17:
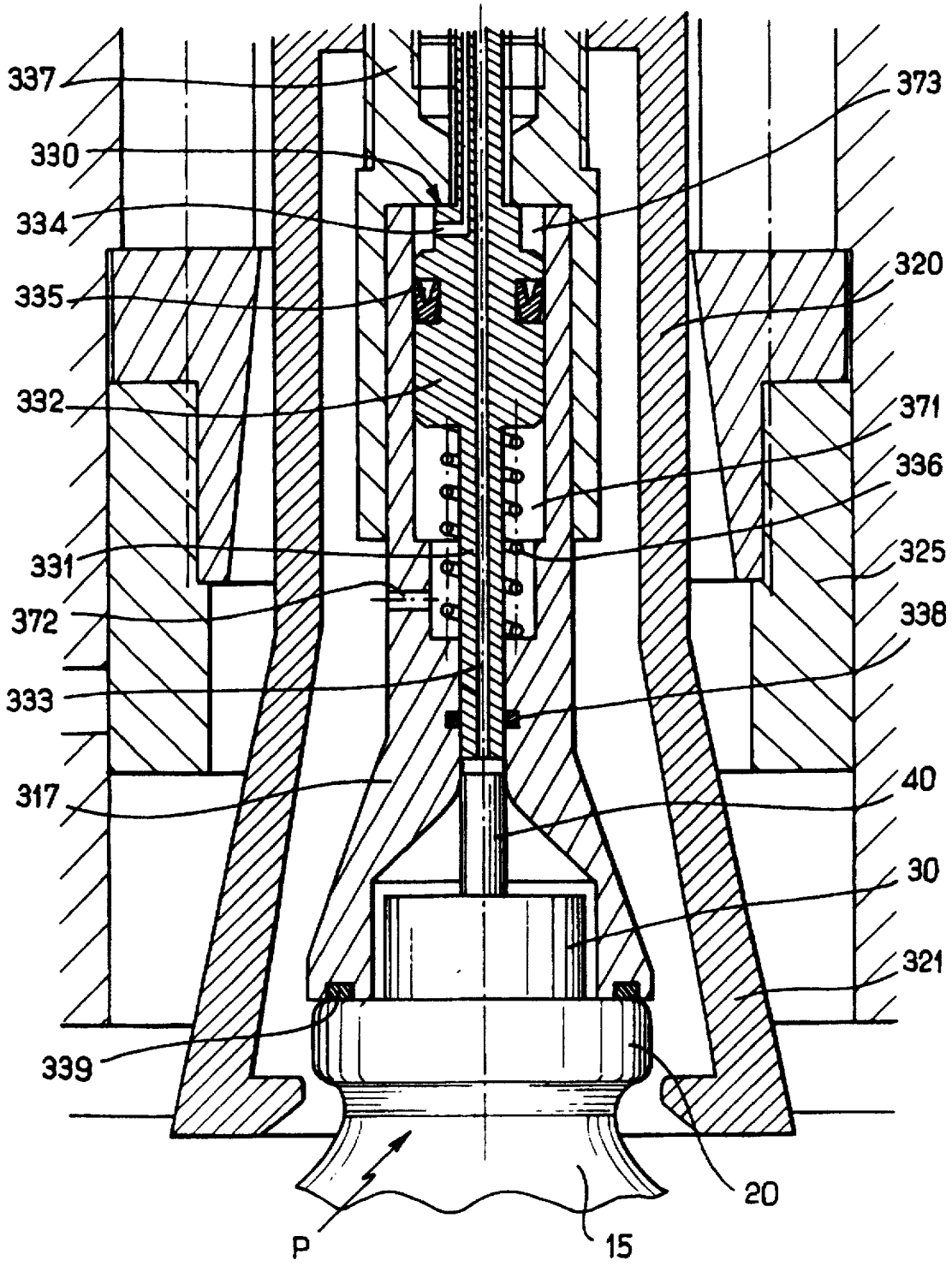
FIG. 17 shows a detail of a different embodiment of the crimping assembly of apparatus of the invention.

In such cases, another embodiment of the present apparatus is preferred. This embodiment is identical to the preceding embodiment with respect to the group of components 300 to 308 constituting the bottom ring and the group of components 310 to 318 forming the head per se. Only the crimping assembly and more particularly the centering device 317 is changed. FIG. 17 shows how in greater detail.

Thus, in this version of the present apparatus, the centering device 317 is constituted by two coaxial cylindrical parts, a top part 337 fitting is sealed manner around a bottom part (which performs the function of the centering device 317). The centering device 317 is hollow so that it contains an internal piston 332 having a piston rod 331 about the same axis as the centering device 317, and comparable in diameter to the diameter of the actuator rods 40 for the pumps P. The hollow in the centering device 317 is designed to enable the piston 332 to divide it in conventional manner into a top chamber 373 and a bottom chamber 371, with the chambers being isolated from each other by a piston ring 335 disposed around the piston 332.

The piston then moves in the hollow inside the centering device 317 under the combined effects firstly of pressure, in particular air pressure, injected into the top chamber 373 via a duct 334 of the piston rod 331 and secondly of a return spring 336 disposed round the rod 331 inside the bottom chamber 371. In FIG. 17, the return spring thrusts the piston 332 fully upwards to come into abutment against the top part 337 at a shoulder 330 provided for this purpose on its rod 331. By putting the top chamber 373 under pressure, the piston 332 can be caused to move down against the spring 336, with the air contained in the bottom chamber escaping via a vent 372.

The free end of the piston rod 331 is then applied against the pump actuator rod 40 and the actuator rod is lowered by the rod 331. In particular, for the type of pump P described above, this has the effect of putting the pump chamber 55 into communication with the outside of the dispenser (see FIG. 6). A gas can then be injected into the pump chamber 55 via a channel 333 extending lengthwise along the rod 331 and its piston 332. Sealing rings 338 and 339 disposed respectively around the piston rod 331 and around the base of the centering device 317 prevent the gas injected via the channel 333 from escaping.

The piston 332 as described above is put into operation only at the end of the third stage of the above packaging method, and more particularly after the pump P has been fixed on the container R and while the enclosure constituted by sealed application of the apparatus 3 against the socket 1 is still evacuated. The gas which is thus injected into the pump chamber may be air at atmospheric pressure, nitrogen at a pressure higher than atmospheric (e.g. 2 bars), or any other gas at an appropriate pressure for the intended purpose. This purpose is to establish a pressure inside the pump chamber such that after the vacuum around the dispenser has been broken, the substance contained in the dispenser does not penetrate into the pump chamber. In other words, the gas must be injected at sufficient pressure so that once the pump chamber has returned to its initial volume, the pressure therein is greater than the pressure inside the container of the distributor after the pump has been fitted thereto.

This addition to the third stage of the present method serves to for satisfy practical requirements is nevertheless not essential in the context of the present invention. The reader will observe that it is completely pointless when using dispenser pumps where admission to the pump chamber is not controlled by a non-return valve (a ball or a gasket). Not only would pressure not eliminate the risk of substance penetrating into the pump chamber after the evacuated space is opened, but it would spoil the result of the present vacuum packaging method, in particular by injecting air via the channel 33.

Figure 18:
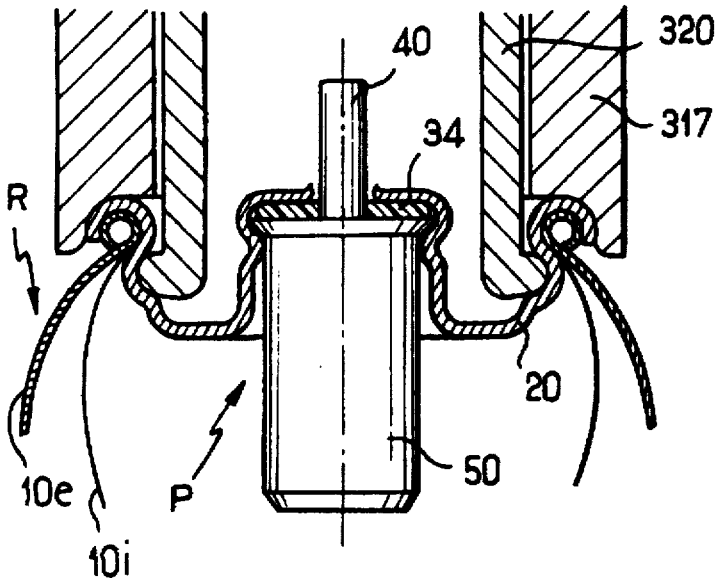
FIG. 18 is an axial section showing details of an assembly for fixing a pump in accordance with the invention by outwardly-directed crimping.

It will readily be understood that the packaging method of the invention is applicable to a wider range of containers than the particular dispenser described above and constituted by a deformable pouch and a precompression pump. Firstly a wide range of dispenser members are available. This applies not only to the way they operate, but also to the way they are fixed on the container. Although inwardly-directed crimping as described above is very widespread, outwardly-directed crimping is also widespread. However it is generally used only for fixing dispenser members that are relatively large in size (diameter greater than 1"). In this case crimping caps 20 are used as shown in section in FIG. 18. Like the collar described above, the cap covers a portion of the pump and its outer edge is then engaged on the container R constituted in this case by a metal can 10e protecting an internal deformable pouch 10i. However between these two bearing zones, the cap has an annular groove. The teeth of the clamp 320 penetrate into this groove in order to thrust the cap beneath the rim of the container while the centering device 317 applies an abutment force against said rim. Fixing is thus in principle the same except in that the centering device 317 is now disposed around the clamp 320. The person skilled in the art will understand that apparatus similar to that described above for inwardly-directed crimping in a vacuum in accordance with the present invention can readily be developed for performing outwardly-directed crimping in a vacuum (e.g. by using a cam which causes the clamps to splay apart as it moves around them).

Figure 19:
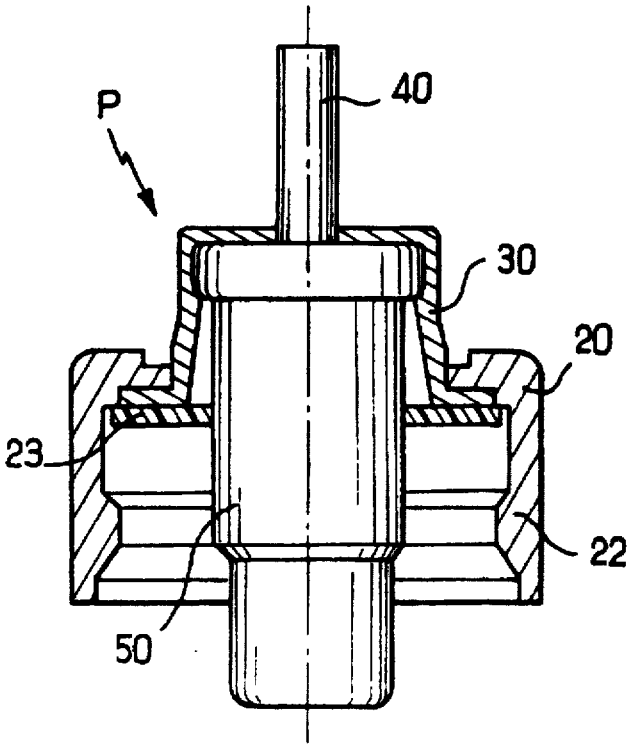
FIG. 19 is an axial section through a snap-fastenable pump capable of forming a part of a dispenser of the invention.

In the same manner, the present method is applicable to fixing a dispenser member by snap-fastening. As shown in FIG. 19 by way of example, the pump P then includes a ring provided with internal relief 22 instead of being provided with a crimping cap or collar. The relief is designed to snap over a lip on the neck of the container. The apparatus 3 for implementing the third stage of the method is then substantially as shown in FIGS. 11 to 14 except in that it no longer includes a crimping assembly. Fixing is obtained merely by bringing the centering device 317 gently into abutment against the ring 20 under control of the leakage shock absorber.

Figure 20:
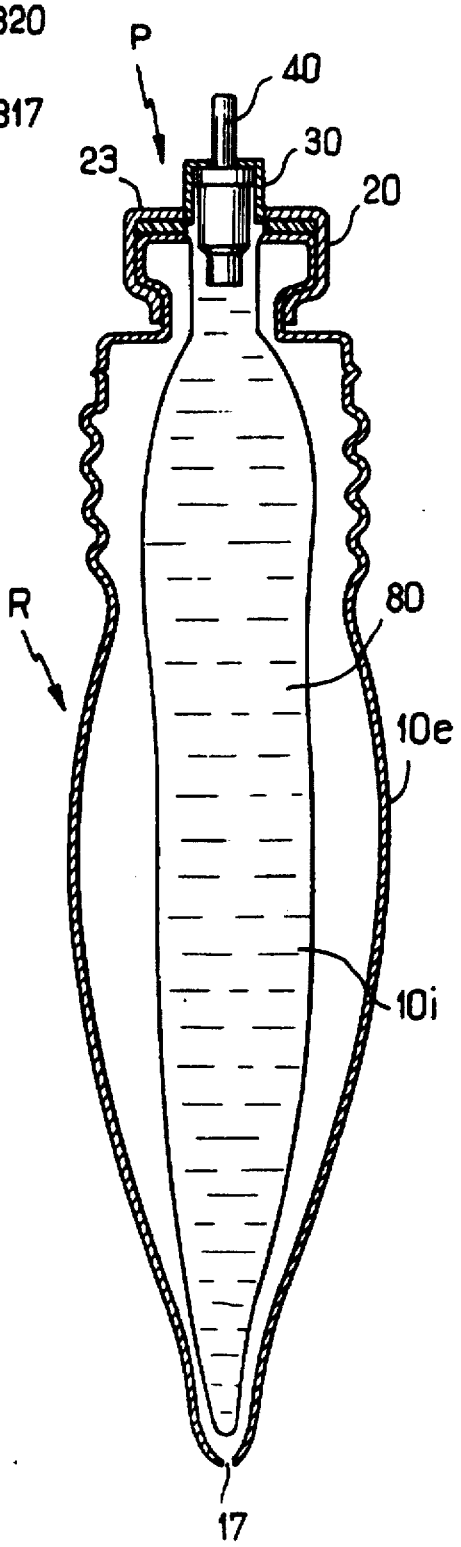
FIG. 20 is an axial section through a second dispenser of the invention.

A wide range of container types can be used for the container R, providing only that they are provided with means for varying their capacity. These types include a container whose body comprises a two-layer pouch as shown in section in FIG. 20. The outer pouch 10e may be rigid, for example, while the inner pouch 10i may be flexible. They may be formed integrally by coextrusion with their only point of contact being around the neck 15. A vent hole 17 then allows the intermediate space between the two pouches to be kept at the same pressure as the outside of the container.

It is thus possible to expel the air from the full inner pouch 10i by implementing the second and third stages of the present method. However, to do this it is preferable for the two-pouch container to be placed in a socket similar to that shown in FIGS. 7 and 8 during the first stage even if the jaws are moved together only sufficiently to hold the container securely in the socket (and not to deform it). After being filled, the inner pouch of the container will deform little by little as substance is dispensed. Meanwhile the outer pouch is rigid and retains a shape suitable for handling.

Another container R suitable for use in the context of the present invention is shown in axial section in FIG. 21. Its body comprises a rigid cylinder 10 which narrows down to a neck 15 at one end. As shown in the figure, a collar 20 enables a pump P to be crimped onto the neck 15. A gasket 23 seals this connection. Optionally, the rod 40 of the pump P is engaged in a pushbutton 90 which includes a dispenser nozzle 91. A guide cylinder 92 bears, for example, around the neck 15 of the container and serves to guarantee proper displacement of the bushbutton 90 relative to the pump P. Finally, a cover 11' is placed over the container to protect the dispenser member.

The other end of the cylinder 10 is open. It is closed to ambient air by a scraper piston 100'. This piston has peripheral sealing lips 101' for bearing in sealed manner against the inside wall of the cylinder 10. The piston 100' also has ring-shaped projections 102' and 103' about the axis of the container R. Projection 103' is disposed to project into the substance 80. As a result, the inside volume that remains when the dispenser is empty is minimized (see FIG. 22). The other projection 102' projects the other way. When the dispenser is full it determines the end of the stroke of the piston 100' by coming into abutment against a closure plate 16'. In the embodiment of FIG. 21, this plate 16' is wedged between the free end of the cylinder 10 and a sleeve 12' engaged thereabout. Finally, the plate 16' includes a vent hole 17 in order to allow the scraper piston 100' to move up inside the cylinder 10.

FIGS. 22 and 23 show the same container as FIG. 21 but this time without its cover 11' and without its pump.

However the closure plate 16' and the sleeve 12' are already in place having been assembled thereon by the manufacture of the container. It is assumed that the container is filled on the premises of the pharmacist or cosmetics manufacture having a substance to be packaged, and these figures show a filling operation which has hardly begun in FIG. 22 and which is about half way through in FIG. 23. For this purpose, a plug 202 is brought into contact with the neck 15' and is pressed thereagainst. An injector 200 passes through the plug 202. The substance 80 is injected under pressure by the injector 200. It begins by filling the space inside the ring projection 103' of the scraper piston 100' (see FIG. 22) and thus pushes the piston 100' towards the free end of the cylinder 10 (see FIG. 23). This method makes it possible to fill substantially all of the cylinder 10 without running the risk of trapping bubbles of air (except for the space 18 which corresponds to the initial volume of the neck 15 and of the projection 103').

After filling has been completed and the plug 202 and the injector 200 have been removed, a pump may be crimped onto the container using the vacuum packaging method described above. This produces a dispenser as shown in above-described FIG. 21. The substance 80 contained therein is thus protected from the air. The dispenser pump P can dispense substance because the scraper piston 100' moves along the cylinder 10 and adapts the capacity of the container R to the quantity of substance that remains.

Figure 24:
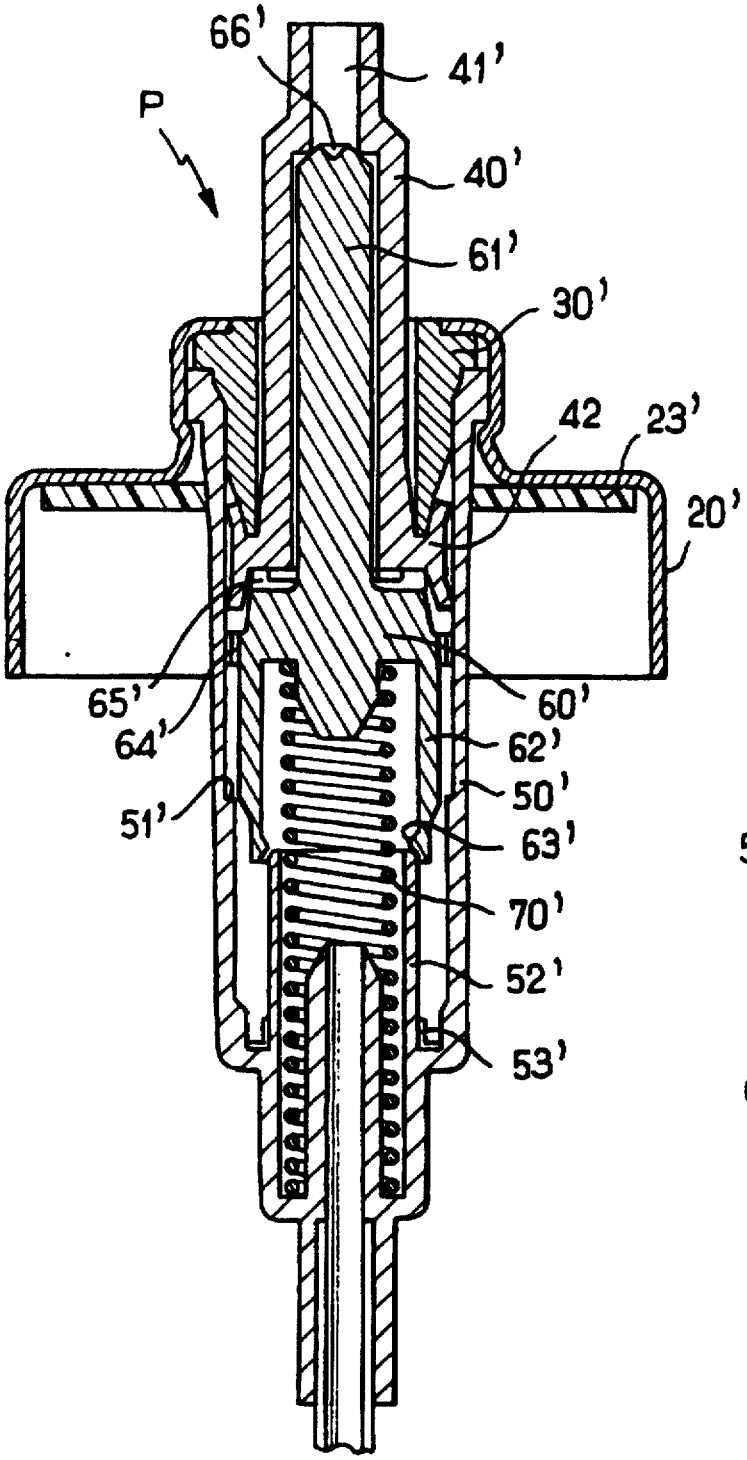
FIG. 24 is an axial section through a pump that prevents ingress of air and which is advantageously used in forming a fourth dispenser of the present invention, with the pump being shown at rest in this figure.
Figure 25:
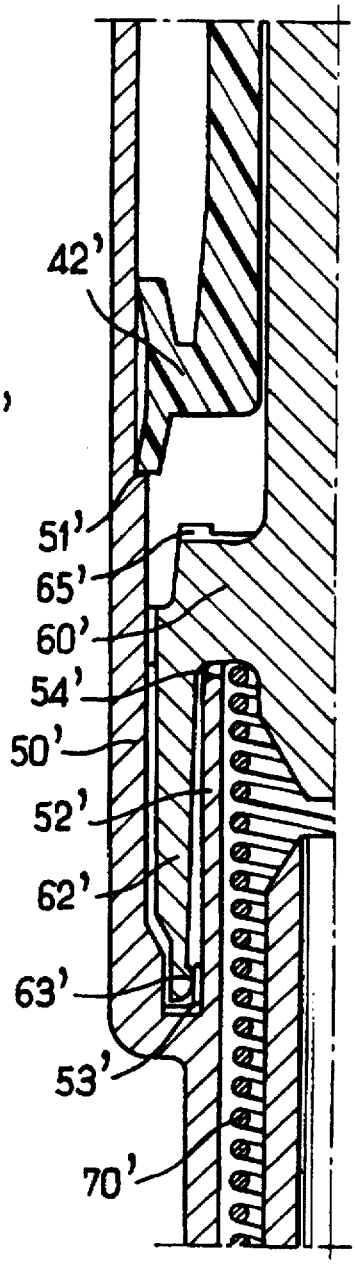
FIG. 25 is a fragmentary section through the FIG. 24 pump, with the pump being shown in its low position for propellant gas injection.

Yet another method of obtaining a variable-capacity dispenser consists in filling a flask or can type container R with a propellant gas which is intended to overlie a liquid substance to be dispensed. In order to form such a dispenser, a container having its rigid body is initially filled with substance. This may be done, for example, by means of an injector which moves up inside the container as substance is injected therein. This ensures that the tip of the injector remains level with the surface of the substance, thereby minimizing the amount of air bubbles that are trapped. Thereafter a pump of the type shown in FIGS. 24 and 25 is crimped into place using the vacuum packaging method described above. Once the substance has thus been hermetically sealed inside the dispenser, propellant gas may be injected into the container via such a pump.

This pump is a precompression metering pump P of known type as described, for example, in French patent application No. 88-08653 filed in the name of Valois. It includes two moving pistons 40' and 60' housed one on top of the other inside a pump body 50' having an open first end and a second end which narrows down in the form of a tube for placing inside the container R. The outer piston 40' is hollow, having an internal delivery channel 41', and it also acts as a piston with peripheral sealing lips 42' fitting in sealed manner against the inside wall of the pump body 50'. The inner piston 60' is differential and co-operates with the admission and delivery valves. To do this, it has a plunger 61' at one end engaged in the delivery channel 41' in order to bear against a terminal narrowed portion thereof, and at its other end it has a skirt 62' adapted to engage in sealed manner over a sleeve 52' projecting from the bottom of the pump body 50' and in communication with the container R.

These two pistons 40' and 60' co-operate firstly by means of a spring 70' disposed between the pump body 50' and the differential piston 60' and secondly by means of a ring 30' fixed, for example, to the open end of the pump body 50' by means of a crimping collar 20'. When the hollow piston 40' is pressed down, the differential piston 60' begins by moving down so that its skirt 62' comes into contact with the sleeve 52' and closes the admission valve. Thereafter, the pressure increases in the substance trapped in the annular space between the pump body 50' and the sleeve 52' and the skirt 62' (which space constitutes the pump chamber). When the pressure reaches a value sufficient for lowering the differential pressure 60' relative to the hollow piston 40' against the force of the spring 70', then the substance can be delivered with a precompression effect via the passage opened up between the plunger 61' and the terminal narrowing of the outlet channel 41'.

Substance continues to be delivered in this way so long as the piston 40' continues to move down. When it reaches the end of its stroke, the user ceases to apply force, thereby allowing the spring 70' to relax and allowing the pistons 40' and 60' to rise. The above-defined pump chamber increases in volume again, thereby establishing suction. When the skirt 62' finally leaves the sleeve 52', thereby opening the admission valve, there is sufficient suction to suck substance into the chamber from the container R.

In order to enable the container R to be filled with a propellant gas through the pump P, the parts described above with respect to their disposition and their normal operation, further include the following features:

the tip of the plunger 61' has a small notch 66' for receiving the end of a needle. The needle may form a part of a machine for filling the container with propellant gas. The needle is then inserted down the delivery channel 41' to push back the plunger 61 relative to the hollow piston 40'. In FIG. 25, the needle (not shown) has lowered the differential piston 60' fully against the sleeve 52';

at the base of its plunger 61', the differential piston 60' has spacers 65' for maintaining a minimum spacing between the two pistons;

the inside wall of the pump body 50' is provided with an annular shoulder 51' facing towards its open end. As can be seen in FIG. 25, the shoulder provides an abutment for the sealing lips 42' of the hollow piston 40', and this occurs after a stroke such that the differential piston 60' still has room to move more deeply into the pump body 50';

ribs 53' project from the outside of the root of the sleeve 52' and extend some of the way along the sleeve 52'. As a result, the sealing lip 63' of the skirt 62' is capable of rising over the ribs 53' as soon as the differential piston 60' has moved fully down. Where applicable, crenellations 54' at the top of the sleeve 52' prevent the bottom of the skirt 62' sealing too tightly against the sleeve 52'. A passage is thus left to enable the pump chamber to communicate with the inside of the container.

Propellant gas is thus injected by pushing down the differential piston 60' by means of a needle bearing against the notch 66' until the skirt 62' rises over the ribs 53'. Simultaneously, the hollow piston 40' need not move at all or moves until it comes into abutment against the shoulder 51'. In either case, the outlet valve is thus held open. In other words, a passage then exists from the outside into the container with the pump chamber communicating with the container via the gap between the ribs 53' and between the crenellations 54'.

Once propellant gas is inside the container, it serves not only to put the substance to be dispensed under pressure, but also it expands to fill the volume left empty by the substance as it is dispensed. That is why a dispenser provided with a pump of this type may have a rigid container.

Such vacuum packaged dispensers are particularly useful for conserving substances that are spoiled by contact with the ambient air. All of them have in common the use of a container of variable capacity. The container is filled when it is at maximum capacity and the method of the invention makes it possible to remove all the air therefrom before fixing a dispenser member that prevents ingress of air in sealed manner on the container. In addition, this is performed within an enclosure such that a vacuum is established both inside the container and outside it. This prevents any of the substance being removed from the container during packaging. The full maximum capacity of the container thus contains substance when the packaging constituted by the dispenser is finally delivered to the market.

I claim:

1. A method of vacuum packaging a substance, having a consistency lying in a range from liquid to semi-solid, inside a variable capacity container adapted to be closed by a pump for dispensing said substance without allowing any air ingress inside the container, said pump creating a suction in the container when operated, said container including [a flexible, freely deformable] *at least one movable* wall having a first, outer side normally in contact with atmospheric air, and a second, inner side normally in contact with said substance contained in the container, said [deformable] *at least one movable* wall being able to reduce the volumetric capacity of said container through the suction created by the pump in the container when operated, said method comprising the ordered steps of:

a) [deforming] *moving said at least one movable wall of* the container to increase the volumetric capacity of the container and filling the container with a charge of said substance through an opening of the container, b) disposing the pump on the container opening such that the pump rests loosely without fitting on said opening in a non-sealed manner, c) disposing the container and pump in a completely enclosing enclosure, d) subjecting the enclosure to a vacuum to remove any residual air remaining in the container, and e) while maintaining the vacuum, fixedly and sealingly securing the pump to the container opening.

2. A method according to claim 1, wherein said pump has a hollow actuator rod which communicates with a pump chamber when depressed, and the admission of said substance into the chamber is controlled by a non-return valve, the method further comprising, after step e), the steps of:

f) depressing the hollow rod, and g) injecting a gas into said chamber via the hollow rod while the container and the pump fixed thereon are still in said enclosure maintained under vacuum, h) said gas being injected at a sufficient pressure to ensure that, after atmospheric pressure has been reestablished around the container, the pressure inside the container is less than the pressure inside the pump chamber, thereby preventing the substance from penetrating into the pump chamber.

3. A method according to claim 2, wherein the gas is air injected at atmospheric pressure.

4. A method according to claim 2, wherein the gas is nitrogen injected at a pressure higher than atmospheric pressure.

5. A method according to claim 1, wherein the container includes a resiliently deformable pouch, and wherein, before filling step a), the pouch is deformed such that the container presents a maximum capacity.

6. A method according to claim 1, wherein the container includes a deformable pouch.

*7. A method according to claim 1, wherein said at least one movable wall comprises a flexible, freely deformable wall, and said step of moving said at least one movable wall comprises deforming the at least one movable wall.*

* * * * *